United States Patent [19]

Suzuki

[11] Patent Number: 4,755,577
[45] Date of Patent: Jul. 5, 1988

[54] COMPOSITION FOR COATING OPTICAL COMMUNICATION GLASS FIBER

[75] Inventor: Toshio Suzuki, Chiba, Japan

[73] Assignee: Toray Silicone Co., Ltd., Tokyo, Japan

[21] Appl. No.: 944,718

[22] Filed: Dec. 22, 1986

Related U.S. Application Data

[63] Continuation-in-part of Ser. No. 831,234, Feb. 18, 1986, abandoned.

[30] Foreign Application Priority Data

Feb. 22, 1985 [JP] Japan .................................. 60-35147

[51] Int. Cl.$^4$ ...................... C08G 77/12; C08G 77/08; C08G 77/20
[52] U.S. Cl. ...................................... 528/15; 525/478; 528/31; 528/32; 350/96.29; 350/96.34
[58] Field of Search .......................... 525/478; 528/15; 350/96.29, 96.34

[56] References Cited

U.S. PATENT DOCUMENTS

| | | | |
|---|---|---|---|
| 2,676,182 | 4/1954 | Daudt et al. | 260/448.2 |
| 3,284,406 | 11/1966 | Nelson | 260/46.5 |
| 4,380,367 | 4/1983 | Suzuki | 350/96.34 |
| 4,535,141 | 9/1985 | Kroupa | 528/15 |
| 4,623,700 | 11/1986 | Travor et al. | 525/478 |
| 4,642,265 | 2/1987 | Suzuki | 528/15 |

FOREIGN PATENT DOCUMENTS 130844 10/1980 Japan .

*Primary Examiner*—Wilbert J. Briggs, Sr.
*Attorney, Agent, or Firm*—Roger H. Borrousch

[57] ABSTRACT

Coating compositions for optical communication glass fiber which have improved toughness and release characteristics is made from an organopolysiloxane having vinyl and 20 to 50 mole percent phenyl radical, a polysiloxane having dimethylvinyl-siloxane units and $SiO_2$ units, an organohydrogenpolysiloxane, and a platinum catalyst.

10 Claims, No Drawings

COMPOSITION FOR COATING OPTICAL COMMUNICATION GLASS FIBER

This application is a continuation-in-part application of Ser. No. 831,234, filed Feb. 18, 1986, now abandoned.

BACKGROUND OF THE INVENTION

1. Field of the Invention

The present invention relates to a coating composition for use on optical communication glass fibers. More specifically, the present invention relates to a silicone coating composition to be used on quartz optical communication glass fibers.

2. Background Information

Optical communication fibers are available in numerous types such as quartz types, multicomponent types, and plastic types; however, quartz optical fibers are used for long-distance or high-capacity communications. The surface of these quartz optical fibers is usually covered with a coating which protects the fiber from external forces and water. The coating composition described in Japanese Kokai [Laid Open] patent No. 55-[1980]-130844, whose principal component is a methylphenylpolysiloxane, is an adequate coating in this respect and has been used with many optical fibers up to now. U.S. Pat. No. 4,380,367, issued Apr. 19, 1983, to Suzuki is equivalent to Japanese Kokai [Laid Open] patent No. 55-[1980]-130844.

DISADVANTAGES OF THE PRIOR ART COATINGS

However, coating compositions prior to the present invention suffer from the disadvantage that they tightly adhere to the surface of quartz glass, with the result that the cured films are difficult to remove when connecting optical fibers. In addition, previous coating compositions have the disadvantage that their cured films rupture during optical fiber production due to the very low strength of the cured material.

SUMMARY OF THE INVENTION

The goal of the present invention is to eliminate the above-cited disadvantages of the prior art by providing a coating which does not adhere too tightly to the surface of an optical fiber and whose cured product has a high strength so that the cured film may be easily removed during the connection of optical fibers while not being subject to breakage during optical fiber production.

The present invention relates to a composition suitable for coating optical communication glass fiber comprising (a) 100 parts by weight of an organopolysiloxane having an average unit formula $$R_aSiO_{(4-a)/2}$$

in which R is a monovalent hydrocarbon radical where from 20 inclusive to 50 exclusive mole percent is phenyl and 50 inclusive to 80 exclusive mole percent is methyl and the sum of the phenyl and methyl is less than 100 mole percent and a has an average value of 1.8 to 2.2, said organopolysiloxane contains at least two lower alkenyl radicals directly bonded to silicon atoms in each molecule. (b) from 0.5 to 30 parts by weight of polysiloxane with a viscosity of 10 Pa.s of less at 25° C. and having from 5 to 80 mole percent $(CH_3)_2(CH_2=CH)SiO_{\frac{1}{2}}$ units, from 0 to 50 mole percent $(CH_3)_3SiO_{\frac{1}{2}}$ units, and from 20 to 70 mole percent SiO$_2$ units. (c) organohydrogenpolysiloxane having at least two silicon-bonded hydrogen atoms per molecule. and being present in an amount sufficient to provide a molar ratio of silicon-bonded hydrogen atoms in (c) to total alkenyl radical in (a) and (b) of from 0.7:1 to 3.0:1, and (d) a platinum catalyst in an amount of from 0.1 to 100 parts by weight platinum metal per one million parts by weight of the sum of (a), (b), and (c).

DESCRIPTION OF THE PREFERRED EMBODIMENTS

Component (a) is the principal component of the coating composition of the present invention. It reacts and crosslinks with component (c) in the presence of the catalytically active component (d) through an addition reaction to form a film. This component is an organopolysiloxane having the average unit formula $$R_aSiO_{(4-a)/2}$$

which possesses at least two lower alkenyl radicals directly bonded to silicon atoms in each molecule. In the unit formula, R is monovalent hydrocarbon radical wherein 20 (inclusive) to 50 (exclusive) mole percent must be phenyl and 50 (inclusive) to 80 (exclusive) mole percent must be methyl and the total of phenyl and methyl must be less than 100 mole percent. These characteristics are required in order to maintain the transmission properties of the optical fiber covered with the coating. Examples of the monovalent hydrocarbon radical, R, are methyl and phenyl, as well as, alkenyl radicals such as vinyl and allyl; other alkyl radicals such as ethyl, propyl, and butyl and halogenated hydrocarbon radicals wherein the above-mentioned hydrocarbon radicals are partially substituted by halogen. In addition, this component may contain a very small quantity of hydroxyl or alkoxy groups directly bonded to silicon atoms. Preferred coating compositions to be used for optical fibers are those having 20 to 35 mole percent phenyl, 0.3 to 3.0 mole percent vinyl. and the remainder methyl. has an average value of 1.8 to 2.2, but advantageously has an average value of 1.95 to 2.05 from the standpoint of good coatability. This component's degree of polymerization is arbitrary. but the viscosity at 25° C. should be 0.5 to 20 Pa.s to obtain a good coatability. The configuration of this component is a straight chain, a branched chain, or a network, but is preferably a straight chain or a straight chain with branches to obtain good coatability. The siloxane units constituting this component are the R$_2$SiO, R$_3$SiO$_{\frac{1}{2}}$, and RSiO$_{3/2}$ units. Examples of this component are dimethylvinylsiloxy-terminated dimethylsiloxanediphenylsiloxane copolymers, dimethylvinylsiloxy-terminated dimethylsiloxanemethylphenylsiloxane copolymers, dimethylvinylsiloxy-terminated dimethylsiloxanemethylphenylsiloxane-methylvinylsiloxane copolymers, trimethylsiloxy-terminated dimethylsiloxanediphenylsiloxane-methylvinylsiloxane copolymers, and trimethylsiloxy-terminated dimethylsiloxanemethylphenylsiloxane-methylvinylsiloxane copolymers.

Component (b) plays the important roles of reducing the adhesion of the coating composition of the present invention to optical fibers, particularly quartz optical fibers, and also of imparting high strength to the cured material. This component is the most characteristic component of the coating composition of the present invention. This component is composed of 5 to 80 mole percent $(CH_3)_2(CH_2=CH)SiO_{\frac{1}{2}}$ units, 0 to 50 mole percent $(CH_3)_3SiO_{\frac{1}{2}}$ units, and 20 to 70 mole percent $SiO_2$ units. It is a polysiloxane with a viscosity of 10 Pa.s or less at 25° C. With less than 5 mole percent $(CH_3)_2(CH_2=CH)SiO_{\frac{1}{2}}$ units, (vinyl siloxy units) the adhesion- reduction effect does not appear and, in addition, the resulting polysiloxane will not be compatible with component (a), which prevents the crosslinking reaction. On the other hand, when the polysiloxane has a content of the vinyl siloxy units of greater than or equal to 80 mole percent, its coating layer will not be flexible and it will be unsatisfactory as a coating composition for optical fibers. The content of these vinyl siloxy unit is preferably 10 to 75 mole percent. The $(CH_3)_3SiO_{\frac{1}{2}}$ unit is not necessarily present, but this unit may be present in a quantity up to 50 mole percent in order to reduce the cost of the coating composition or to impart flexibility. When this component has an $SiO_2$ unit content of less than 20 mole percent, the adhesion-reduction effect will not appear. On the other hand, when this component has an $SiO_2$ unit content exceeding 70 mole percent, the compatibility with component (a) is poor. Consequently, the content of said unit is 20 to 70 mole percent. This component is a network polymer in which $SiO_2$ units form the nuclei, and its viscosity must be 10 Pa.s or less at 25° C. When this component has a viscosity exceeding 10 Pa.s, its compatibility with component (a) is poor and the crosslinking is inhibited. The viscosity of this component is preferably 0.01 to 5 Pa.s and more preferably 0.05 to 2 Pa.s. This component is blended at 0.5 to 30 parts by weight and preferably 1 to 20 parts by weight per 100 parts by weight of component (a). When this component is blended at less than 0.5 parts by weight, excessive adhesion by the cured film to the surface of the optical fiber will not be adequately prevented. When this quantity exceeds 30 parts by weight, the resulting coating composition will not provide the flexibility necessary for an optical fiber coating.

This component (b) may be synthesized by methods known in the art. Component (b) is preferably prepared by the method described in an application Ser. No. 831,235 entitled, "Method For Producing Organosilicon Polymers and The Polymers Prepared Thereby" by Akihiko Shirahata filed Feb. 18, 1986, and assigned to the same assignee, now abandoned. This application is hereby incorporated by reference to show the method for producing the polysiloxanes and the polysiloxanes produced by the method. The continuation-in-part application of Ser. No. 831,235, Ser. No. 921,976, filed Oct. 22, 1986, now U.S. Pat. No. 4,707,531, issued Nov. 17, 1987, is also hereby incorporated by reference to show the method for producing the polysiloxanes and the polysiloxanes produced by the method.

Component (c) is the crosslinking agent for components (a) and (b) in the presence of the catalyst comprising component (d). It addition-reacts with both components (a) and (b) to form a cured film. This component is an organohydrogenpolysiloxane with at least two silicon-bonded hydrogen atoms in each molecule. This component has an arbitrary structure and may be any of straight chain, branched chain, cyclic, or network. The presence of phenyl radicals in the molecule of component (c) or a low molecular weight is preferred in order to provide compatibility with components (a) and (b). When the phenyl radical is not present in the molecule, the molecular weight is determined by the condition that the viscosity should be 1 Pa.s or less at 25° C. When the phenyl radical is present in the molecule, the molecular weight is determined by the condition that the viscosity should be 10 Pa.s or less at 25° C. This component contains at least two hydrogen atoms directly bonded to silicon in each molecule, but a content of approximately 3 to 10 Si-bonded hydrogen atoms in each molecule is advantageous for obtaining a high-quality cured film. Examples of the Si-bonded organic groups are methyl, phenyl, ethyl, propyl, hexyl, and 3,3,3-trifluoropropyl. Examples of this component are trimethylsiloxy-terminated methylhydrogenpolysiloxane,
trimethylsiloxy-terminated dimethylsiloxanemethylhydrogensiloxane copolymers,
trimethylsiloxy-terminated methylphenylsiloxanemethylhydrogensiloxane copolymers,
trimethylsiloxy-terminated diphenylsiloxanemethylhydrogensiloxane copolymers,
dimethylhydrogensiloxy-terminated methylhydrogenpolysiloxane,
dimethylhydrogensiloxy-terminated dimethylsiloxanemethylhydrogensiloxane copolymers,
dimethylhydrogensiloxy-terminated methylphenylsiloxane-methylhydrogensiloxane copolymers,
dimethylhydrogensiloxy-terminated diphenylsiloxanemethylhydrogensiloxane copolymers,
dimethylsiloxane-methylhydrogensiloxane cyclic copolymers,
copolymers of $(CH_3)_2HSiO_{\frac{1}{2}}$ and $SiO_2$ units, and
copolymers of $(CH_3)_3SiO_{\frac{1}{2}}$, $(CH_3)_2HSiO_{\frac{1}{2}}$, and $SiO_2$ units.

The quantity of addition of this component, expressed in parts by weight must give a molar ratio of 0.7:1 to 3.0:1 for Si-bonded hydrogen atoms in this component to the total of all alkenyl radicals in components (a) and (b). When this ratio is less than 0.7:1, crosslinking is inadequate and an excellent cured film cannot be produced. When this ratio exceeds 3.0:1, the cured film is so hard that it becomes inappropriate as an optical fiber coating. For this reason, the most preferred quantity of addition of this component is that amount in parts by weight which generates a ratio of 0.8:1 to 2.0:1.

The platinum catalyst comprising component (d) causes the addition reaction of Si-bonded hydrogen atoms in component (c) with alkenyl groups in components (a) and (b). Various platinum catalysts for this application have been known for some time and examples are chloroplatinic acid, saturated or unsaturated alcohol or ketone solutions of chloroplatinic acid, chloroplatinic acid-olefin complexes, chloroplatinic acid-alkenylsiloxane complexes, and platinum black or metallic platinum supported on a carrier. The quantity of platinum of this component is 0.1 to 100 parts by weight as platinum metal per one million parts by weight (ppm) of the combined quantities of components (a), (b), and (c). When the amount of platinum falls below 0.1 ppm, the crosslinking reaction will not proceed to a sufficient extent. On the other hand, when the amount of platinum exceeds 100 ppm, the composition becomes uneconomical while the resulting coating composition has an extremely short use time at room temperature. Due to this, the quantity of platinum catalyst of the instant component is generally 0.5 to 50 ppm as platinum metal.

The coating composition of the present invention is produced by simply mixing components (a) through (d) with each other. Various types of liquid mixing devices may be used here, such as planetary mixers and screw mixers.

To coat an optical fiber with the coating composition of the present invention. the mixed and degassed composition of components (a) through (d) is coated on the optical fiber and then cured. Heating with an electric furnace or infrared oven is preferred for this curing.

In addition to components (a) to (d), a small quantity of platinum catalyst inhibitor such as acetylene compounds, alkenyl group-containing compounds, hydrazines, triazoles, phosphines, mercaptans, etc., can be added to the coating composition of the present invention in order to inhibit reaction at room temperature. Furthermore. additives such as silica powder fillers, etc., thermal stabilizers, colorants, and flame retardants may also be optionally added unless they adversely affect the goal of the present invention. The coating composition of the present invention is desirably used without a solvent, but it may be arbitrarily diluted with an organic solvent such as aromatic hydrocarbon, alkane hydrocarbon, halogenated hydrocarbon or ketone in order to reduce the viscosity.

The present invention will be illustrated by examples. The viscosity in the examples is the value measured at 25° C and "parts" and "%" denote "parts by weight" and "weight percent" respectively.

EXAMPLE 1

100 Parts dimethylvinylsiloxy-terminated dimethylsiloxane-methylphenylsiloxane (40:60 molar ratio) copolymer with a viscosity of 8 Pa.s was thoroughly mixed with 5 parts polysiloxane having a viscosity of 0.85 Pa.s composed of 75 mol % $(CH_3)_2(CH_2=CH)SiO_{\frac{1}{2}}$ units and 25 mol % $SiO_2$ units, 4 parts dimethylhydrogensiloxy-terminated methylhydrogenpolysiloxane having a viscosity of 0.008 Pa.s. 0.2 part of 2% solution of chloroplatinic acid in 2-methylhexanol and 0.01 part 3-phenyl-1-butyn-3-ol to give an optical fiber coating composition in which the (total Si-bonded hydrogen)/(total vinyl radicals) molar ratio=1.5:1. The produced coating composition was coated on 125 micrometer diameter quartz optical fiber using a coating die and then cured in an electric furnace at 600° C for 2 seconds. The resulting 50 micrometer thick cured film was peeled from the surface of the optical fiber using a film stripper expressly designed for optical fibers. The cured film was removed without leaving any residue on the optical fiber and the tensile strength of the cured film was 490.3 kPa.

For comparison. coating compositions were produced and tested as above with the exception that the polysiloxane composed of $(CH_3)_2(CH_2=CH)SiO_{\frac{1}{2}}$ and $SiO_2$ units was omitted from the coating composition. Also, said polysiloxane was omitted from the coating composition while the blended quantity of dimethylhydrogensiloxyterminated methylhydrogenpolysiloxane was reduced to 2 parts in order to maintain a molar balance with the vinyl radicals. The two comparison examples both had greater than or equal to 20% residual cured film on the quartz optical fiber and the tensile strengths of the cured films were 147.1 kPa and 196.1 kPa, respectively.

EXAMPLE 2

100 Parts dimethylvinylsiloxy-terminated dimethylsiloxane-methylphenylsiloxane (42:58 molar ratio) copolymer with a viscosity of 2.5 Pa.s was thoroughly mixed with 8 parts polysiloxane with a viscosity of 3.2 Pa.s and composed of 46 mol % $(CH_3)_2(CH_2=CH)SiO_{\frac{1}{2}}$ units. 18 mol % $(CH_3)_3SiO_{\frac{1}{2}}$ units. and 36 mol % $SiO_2$ units: 13 parts polysiloxane with a viscosity of 0.075 Pa.s composed of 28 mol % $(CH_3)_2HSiO_{\frac{1}{2}}$ units, 32 mol % $(CH_3)_3SiO_{\frac{1}{2}}$ units, and 40 mol% $SiO_2$ units: 0.3 part 2% solution of chloroplatinic acid in ethylhexanol and 0.01 part 3-phenyl-1-butyn-3-ol to obtain an optical fiber coating composition with a (total SiH)/(total vinyl radical) molar ratio =1.0:1. The produced coating agent was coated on a 125 micrometer diameter quartz optical fiber using a coating die and then cured in an electric furnace at 700° C. for 1 second. The resulting 60 micrometer thick cured film was peeled from the optical fiber surface using a film stripper expressly designed for optical fibers. The cured film was removed without any residue on the optical fiber and the tensile strength of the cured film was 637.4 kPa.

In a comparison example. a coating composition was produced and tested as above with the exception that the polysiloxane composed of $(CH_3)_2(CH_2=CH)SiO_{\frac{1}{2}}$ units. $(CH_3)_3SiO_{\frac{1}{2}}$ units, and $SiO_2$ units was omitted from the coating composition while the blended quantity of polysiloxane composed of $(CH_3)_2HSiO_{\frac{1}{2}}$ units and $SiO_2$ units was reduced to 3 parts in order to maintain the molar balance with the vinyl radicals. The results showed that greater than or equal to 30% of the cured film remained on the optical fiber and the tensile strength of the cured film was 274.6 kPa.

EXAMPLE 3

100 Parts dimethylvinylsiloxy-terminated dimethylsiloxane-methylphenylsiloxane (30:70 molar ratio) copolymer with a viscosity of 3 Pa.s was thoroughly mixed with 3 parts polysiloxane with a viscosity of 1.6 Pa.s and composed of 64 mol %

$(CH_3)_2(CH_2=CH)SiO_{\frac{1}{2}}$ units and 36 mol % $SiO_2$ units, 4 parts polysiloxane with the formula $[(CH_3)_2HSiO]_4Si$, 0.15 part 2% solution of chloroplatinic acid in isopropanol and 0.01 part 3-methyl-1-butyn-3-ol to give an optical fiber coating composition with a (total SiH)/(total vinyl radical) molar ratio—1.4:1. The produced coating composition was coated on a 125 micrometer diameter quartz optical fiber using a coating die and then cured in an electric furnace at 600° C. for 2 seconds. When the resulting cured film was wiped from the surface of the optical fiber using acetone-impregnated gauze, it was removed without leaving a residue on the fiber in 5 wipes.

In comparison example. a coating composition was produced and tested as above by omitting the polysiloxane composed of $(CH_3)_2(CH_2=CH)SiO_{\frac{1}{2}}$ units and $SiO_2$ units from the preceding coating composition while the blended quantity of polysiloxane with the formula $[(CH_3)_2HSiO]_4Si$ was reduced to 2 parts in order to maintain the molar balance with the vinyl radicals. The results showed that the cured film could not be completely removed in 20 wipes.

EXAMPLE 4

100 Parts dimethylvinylsiloxy-terminated dimethylsiloxane-diphenylsiloxane (67:33 molar ratio) copolymer with a viscosity of 2.8 Pa.s was thoroughly mixed with 10 parts polysiloxane with a viscosity of 1.2 Pa.s and composed of 18 mol % $(CH_3)_2(CH_2=CH)SiO_{\frac{1}{2}}$ units, 46 mol % $(CH_3)_3SiO_{\frac{1}{2}}$ units; and 36 mol % $SiO_2$ units, 6.5 parts dimethylhydrogensiloxy- terminated diphenylsiloxane-methylhydrogensiloxane (20:80 molar ratio) copolymer with a viscosity of 0.045 Pa.s. 0.15 part 2% solution of chloroplatinic acid in isopropanol and 0.01 part 3-methyl-1butyn-3-ol to give an optical fiber coating composition with a (total SiH)/(total vinyl radical) molar ratio =2.1:1. The produced coating composition was coated on a 125 micrometer diameter quartz optical fiber using a coating die and then cured in an infrared oven at 450° C. for 1.3 seconds. The resulting cured film was wiped from the optical fiber's surface using an acetone-impregnated gauze without any residue on the fiber in 7 wipes.

For a comparison example, a coating composition was produced and tested as above with the exception that the polysiloxane composed of $(CH_3)_2(CH_2=CH)SiO_{\frac{1}{2}}$, $(CH_3)_3SiO_{\frac{1}{2}}$, and $SiO_2$ units was omitted from the preceding coating composition while the blended quantity of dimethylhydrogensiloxy-terminated diphenylsiloxane-methylhydrogensiloxane copolymer was reduced to 1.2 parts in order to maintain the molar balance with the vinyl radicals. The cured film was not completely removed even in 20 wipes.

COMPARATIVE EXAMPLE 1

100 Parts dimethylvinylsiloxy-terminated dimethylsiloxane-methylphenylsiloxane (40:60 molar ratio) copolymer with a viscosity of 8 Pa.s was thoroughly mixed with 5 parts solid polysiloxane having a melting point of 80° C. and composed of 50 mol % $(CH_3)_2(CH_2=CH)SiO_{\frac{1}{2}}$ units and 50 mol % $SiO_2$ units, 3.8 parts dimethylhydrogensiloxy-terminated methylhydrogenpolysiloxane having a viscosity of 0.008 Pa.s. 0.2 part of 2% solution of chloroplatinic acid in 2-methylhexanol and 0.01 part 3-phenyl-1-butyn-3-ol to give an optical fiber coating composition in which the (total Si-bonded hydrogen)/(total vinyl radicals) molar ratio=1.5:1. However, the solid polysiloxane did not dissolve into the dimethylvinylsiloxy-terminated dimethylsiloxane-methylphenylsiloxane copolymer. The produced coating composition was not a uniform mixture. This coating composition was coated on 125 micrometer diameter quartz optical fiber using a coating die and then cured in an electric furnace at 600° C. for 2 seconds. The resulting 50 micrometer thick cured film was peeled from the surface of the optical fiber using a film stripper expressly designed for optical fibers, however, at least 20% cured film remained on the quartz optical fiber. The tensile strength of the cured film was 27.5 kPa.

Effects of the Invention

Because the optical fiber coating compositions of the present invention are composed of the preceding components (a) through (d) in the specified blending proportions, its cured film does not adhere excessively to optical fibers, and particularly quartz optical fibers, after it is coated on the optical fiber and cured. In addition, the cured film has a high tensile strength, is easily removed during optical fiber connection, and seldom breaks during optical fiber production.

The fiber covered with the coating composition of the present invention is useful in a broad range of applications such as long-distance communications, as well as, submarine optical fibers, CATV optical fibers, and subscriber optical fibers.

That which is claimed is:

1. A composition suitable for coating optical communication glass fiber comprising
   (a) 100 parts by weight of a organopolysiloxane having an average unit formula $$R_aSiO_{(4-a)/2}$$

in which R is a monovalent hydrocarbon radical where from 20 inclusive to 50 exclusive mole percent is phenyl and 50 inclusive to 80 exclusive mole percent is methyl and the sum of phenyl and methyl is less than 100 mole percent and a has an average value of 1.8 to 2.2, said organopolysiloxane contains at least two lower alkenyl radicals directly bonded to silicon atoms in each molecule,
   (b) from 0.5 to 30 parts by weight of polysiloxane with a viscosity of 10 Pa.s or less at 25° C. and having 10 to 75 mole percent $$(CH_3)_2(CH_2=CH)SiO_{\frac{1}{2}}$$

units, from 0 to 50 mole percent $$(CH_3)_3SiO_{\frac{1}{2}}$$

units, and from 20 to 70 mole percent $SiO_2$ units,
   (c) organohydrogenpolysiloxane having at least two silicon-bonded hydrogen atoms per molecule, and being present in an amount sufficient to provide a molar ratio of silicon-bonded hydrogen atoms in (c) to total alkenyl radicals in (a) and (b) of from 0.7:1 to 3.0:1, and
   (d) a platinum catalyst in an amount of from 0.1 to 100 parts by weight platinum metal per one million parts by weight of the sum of (a), (b), and (c).

2. The composition in accordance to claim 1 in which the organopolysiloxane of (a) has from 20 to 35 mole percent phenyl, 0.3 to 3 mole percent vinyl, and the remainder methyl, and a has an average value of from 1.95 to 2.05; the polysiloxane of (b) has a viscosity of from 0.01 to 5 Pa.s and is present in an amount of from 1 to 20 parts by weight; the organohydrogenpolysiloxane of (c) has methyl radicals and hydrogen atoms bonded to the silicon atoms in addition to divalent oxygen atoms, has a viscosity of less than 1 Pa.s at 25° C., has from 3 to 10 silicon-bonded hydrogen atoms per molecule and the molar ratio of silicon-bonded hydrogen atoms to total vinyl in (a) and (b) is from 0.8:1 to 2.0:1; the platinum catalyst of (d) is present in an amount of from 0.5 to 50 parts by weight platinum metal per one million parts by weight of (a), (b), and (c).

3. The composition in accordance to claim 2 further comprising a platinum catalyst inhibitor.

4. The composition in accordance to claim 1 in which the organopolysiloxane of (a) has from 20 to 35 mole percent phenyl, 0.3 to 3 mole percent vinyl, and the remainder methyl, and a has an average value of from 1.95 to 2.05; the polysiloxane of (b) has a viscosity of from 0.01 to 5 Pa.s and is present in an amount of from 1 to 20 parts by weight; the organohydrogenpolysiloxane of (c) has methyl and phenyl radicals and hydrogen atoms bonded to the silicon atoms in addition to divalent oxygen atoms, has a viscosity of less than 10 Pa.s at 25° C., has from 3 to 10 silicon-bonded hydrogen atoms per molecule and the molar ratio of silicon-bonded hydrogen atoms to total vinyl radicals in (a) and (b) is from 0.8:1 to 2.0:1; the platinum catalyst of (d) is in an amount of from 0.5 to 50 parts by weight of platinum metal per one million parts by weight of (a), (b), and (c).

5. The composition in accordance to claim 4 further comprising a platinum catalyst inhibitor.

6. The composition in accordance to claim 2 in which the oranopolysiloxane of (a) is a linear polydiorganopolysiloxane having 35 to 60 mole percent dimethylsiloxane units, 40 to 65 mole percent methylphenylsiloxane units, and endblocked with dimethylvinylsiloxy units, and having a viscosity at 25° C. of from 0.5 to 10 Pa.s; the polysiloxane of (b) is present in an amount of from 1 to 10 parts by weight and has from 40 to 75 mole percent of dimethylvinylsiloxy units, 0 to 20 mole percent trimethylsiloxy units, and 20 to 40 mole percent $SiO_2$ units, and has a viscosity at 25° C. of 0.05 to 5 Pa.s; and the organohydrogenpolysiloxane of (c) is present in an amount of from 2 to 15 parts by weight and has 1 to 80 mole percent of monohydrogendimethyl-siloxy units, 0 to 99 mole percent monomethylhydrogensiloxane units, 0 to 40 mole percent trimethylsiloxy units, and 0 to 45 mole percent $SiO_2$ units.

7. The composition in accordance to claim 6 further comprising a platinum catalyst inhibitor.

8. The composition in accordance to claim 4 in which the organopolysiloxane of (a) is a linear polydiorganosiloxane having from 65 to 75 mole percent dimethylsiloxane units, 25 to 35 mole percent diphenylsiloxane units, and endblocked with dimethylvinylsiloxy units, and has a viscosity at 25° C. of 0.5 to 5 Pa.s; the polysiloxane of (b) is present in an amount of from 5 to 15 parts by weight and has 15 to 25 mole percent dimethylvinylsiloxy units, 40 to 50 mole percent trimethylsiloxy units, and 30 to 40 mole percent $SiO_2$ units, and has a viscosity at 25° C. of from 0.5 to 2 Pa.s; and the organohydrogenpolysiloxane of (c) is present in an amount of from 1 to 10 parts by weight, has 10 to 30 mole percent diphenylsiloxane units, 70 to 90 mole percent methylhydrogensiloxane units, and endblocked with dimethylmonohydrogensiloxy units, and having a viscosity of less than 1 Pa.s.

9. The composition in accordance to claim 8 further comprising a platinum catalyst inhibitor.

10. The composition in accordance with claim 1 in which the organopolysiloxane of (a) has a viscosity of from 0.5 to 20 Pa.s at 25° C., the polysiloxane of (b) has a viscosity of from 0.01 to 5 Pa.s at 25° C., and the organohydrogenpolysiloxane of (c) has a viscosity of 10 Pa.s or less at 25° C.

* * * * *